US006950553B1

(12) United States Patent
Deere

(10) Patent No.: US 6,950,553 B1
(45) Date of Patent: Sep. 27, 2005

(54) METHOD AND SYSTEM FOR SEARCHING FORM FEATURES FOR FORM IDENTIFICATION

(75) Inventor: Emily Ann Deere, Encinitas, CA (US)

(73) Assignee: Cardiff Software, Inc., Vista, CA (US)

( * ) Notice: Subject to any disclaimer, the term of this patent is extended or adjusted under 35 U.S.C. 154(b) by 469 days.

(21) Appl. No.: 09/656,719

(22) Filed: Sep. 7, 2000

Related U.S. Application Data

(60) Provisional application No. 60/191,537, filed on Mar. 23, 2000.

(51) Int. Cl.[7] .................................................. G06K 9/68

(52) U.S. Cl. ....................... 382/218; 382/163; 382/175; 382/190; 382/306; 382/317; 707/6; 707/7; 715/506; 715/508; 715/521

(58) Field of Search ................................ 382/112, 163, 382/173–176, 190, 199, 209, 255, 306, 317–321, 217, 218; 715/505–508, 521–525; 707/6–7

(56) References Cited

U.S. PATENT DOCUMENTS

| | | | | | |
|---|---|---|---|---|---|
| 4,949,392 | A | | 8/1990 | Barski et al. | |
| 5,293,429 | A | | 3/1994 | Pizano et al. | |
| 5,555,101 | A | | 9/1996 | Larson et al. | |
| 5,625,721 | A | * | 4/1997 | Lopresti et al. | 382/309 |
| 5,664,031 | A | | 9/1997 | Murai et al. | |
| 5,699,453 | A | * | 12/1997 | Ozaki | 382/176 |
| 5,721,940 | A | * | 2/1998 | Luther et al. | 715/506 |
| 5,841,905 | A | | 11/1998 | Lee | |
| 5,889,897 | A | * | 3/1999 | Medina | 382/310 |
| 5,937,084 | A | | 8/1999 | Crabtree et al. | |
| 5,943,137 | A | | 8/1999 | Larson et al. | |
| 5,991,469 | A | * | 11/1999 | Johnson et al. | 382/317 |
| 6,023,534 | A | * | 2/2000 | Handley | 382/275 |
| 6,072,461 | A | * | 6/2000 | Haran | 345/629 |
| 6,236,993 | B1 | * | 5/2001 | Fanberg | 707/6 |
| 6,243,501 | B1 | * | 6/2001 | Jamali | 382/305 |
| 6,263,122 | B1 | * | 7/2001 | Simske et al. | 382/311 |
| 6,400,845 | B1 | * | 6/2002 | Volino | 382/176 |
| 6,438,543 | B1 | * | 8/2002 | Kazi et al. | 707/5 |
| 6,539,112 | B1 | * | 3/2003 | Smith | 382/181 |
| 6,606,395 | B1 | * | 8/2003 | Rasmussen et al. | 382/112 |
| 6,665,841 | B1 | * | 12/2003 | Mahoney et al. | 715/520 |

FOREIGN PATENT DOCUMENTS

| | | |
|---|---|---|
| EP | 0 657 838 A2 | 6/1995 |

* cited by examiner

*Primary Examiner*—Bhavesh M. Mehta
*Assistant Examiner*—Gregory Desire
(74) *Attorney, Agent, or Firm*—Knobbe Martens Olson & Bear LLP

(57) ABSTRACT

The invention is a method of and system for identifying a target form for increased efficiency in an automated data capture process. Forms are scanned and stored as digitized images. Regions are defined on the form relative to corresponding reference points between the form and the digitized image. The regions are defined in areas that contain anticipated digitized data from data fields of the form. Digitized data is recognized through such means as optical character recognition (OCR) and the resulting string variable is compared in form to a plurality of formats expected for that data. Scoring systems are used to attain a resultant score for a number of string variables which is compared to a predetermined confidence number. If said confidence number is reached, the form is flagged as a target form and used in the data capture process. A first step identification of certain graphical features can be added as an initial determination as to the source of the form.

33 Claims, 7 Drawing Sheets

81

[redacted]

WMA MANAGED HEALTH SYS
P O BOX 2973
MILWAUKEE WI 53201-2973

X 3898204190

VANCE, TORI L 07 01 74 F VANCE, TORI L
1007 HARVEY AV X 1007 HARVEY AV
BELOIT WI X BELOIT WI
53511 608 0000000 53511 608 0000000
NONE
N 07 01 74 F
N
N S
N

80

SIGNATURE ON FILE 06 22 98 SIGNATURE ON FILE

PIEDMONTE RAYMOND

N 0.00

9818950538

49390

05 06 98 05 05 98 22 04 71020 26 1 32.00 1 N N

391640290 X 246652 N 32.00 0.00 32.00
608 3627888
BELOIT MEMORIAL HOSPITAL BELOIT RADIOLOGY LTD
1969 W HART RD 2101 RIVERSIDE DR
MIGUEL A JIMENEZ MD BELOIT WI 53511- BELOIT, WI 53511-
06 22 98 391640209

Fig. 7

SOMERS POINT, NJ 08244

Prethickened

SOMERS POINT, NJ 08244

Post Thickened

Fig. 8

METHOD AND SYSTEM FOR SEARCHING FORM FEATURES FOR FORM IDENTIFICATION

RELATED APPLICATIONS

This application claims the benefit of U.S. ptent aplication Ser. No. 60/191537, filed Mar. 23, 2000, entitled "Method and System for Searching Form Features for Form Identification.

BACKGROUND OF THE INVENTION

1. Field of the Invention

This invention relates generally to the automated identification of specific forms and documents (hereinafter target forms). In particular, the invention provides for an expedited data capture process using optical imaging technology. By allowing target forms to be automatically identified during the data capture process, an assurance is attained that proper data is captured and the necessity of preprocess sorting of forms is eliminated.

2. Description of the Prior Art

Data capture, a process whereby form data is copied in some manner for input to a database, is a chore many companies undertake for a variety of reasons. For instance, medical offices need to track their patients and put together certain statistical data. The information needed is gleaned off standard forms filled out during each office visit, put into a back office database, and removed in some manner for its intended purpose.

The manual processing of forms is slow and inefficient. This process requires the operator to manually read data off the form and type it directly into the database. The full potential of computers and other digital technologies are unrealized.

In recent years, with the advent of optical imaging capabilities and optical character recognition (OCR) software, data placed on a form can be digitized by such instruments as a scanner or fax machine and the digitized data can be interpreted as text by the OCR software. This OCR software has been embedded into certain data capture software applications (application software) to achieve an automated process that cuts down on the operator's time and improves efficiency. Now the operator need only place a form through a scanning device. The application software converts the digitized images to text and enters it into the database as the software directs. Recognition of the digitized images is extremely accurate. Some application software allows the operator to make corrections to misrecognized text, which is identified as misrecognized through the application software.

The efficiency of the data capture process has improved dramatically over the years, but there are still problems. The application software used today takes data from specified fields of the target form for input into specified fields of the database. Therefore, the application software has to be developed or set up to accommodate a particular form or other similar document type. If what is scanned is not the form intended, the database will receive erroneous data. This occurs frequently when other forms or attachments are mixed in with the stack of forms to be processed. These other forms or attachments may be complementary (complementary documents) to the form subject to data capture (target form), but are nonetheless extraneous and create inefficiencies to this process. To overcome the disadvantage of mixed in complementary documents, a method to identify the target form prior to the data capture process should be implemented.

One such attempt to identify target forms for the purpose of proper data capture is taught in U.S. Pat. No. 5,293,429, by Pizano, et al., entitled, "System and Method For Automatically Classifying Heterogeneous Business Forms," issued Mar. 8, 1994 (429 patent). In this patent, form identification is performed through a pattern recognition system that matches the form to one of a predefined set of templates. These templates are exemplars of the form to be processed. They are scanned, analyzed and stored in a data dictionary for reference. Each of the templates has a unique pattern described by the horizontal and vertical lines that define the form. A recognition phase consists of scanning the data-filled form and matching extracted features of the digitized image, consisting of a set of predefined vertical and horizontal lines, against the set of templates stored in the data dictionary. This is commonly referred to as line template matching. When a match is made against one of the templates, the form is identified and the data capture process begins.

The disadvantage of this type of system is that it is limited to forms that use scannable form features. Many forms today are scanned using dropout scanning. Under this process, form lines, preprinted text and other markings (form features) are drawn in a color similar to the light source used in the scanning device. The scanning device is unable to optically detect images that are in a color similar to their own light source. The purpose of this type of scanning is to prevent misrecognition of data entry characters due to typing or writing on or near the form features. The OCR interpreter's ability to recognize characters decreases substantially when the characters are interfered with; i.e. the lines, markings or preprinted text from the form overlap or approach the entered data. Dropout scanning prevents this from occurring since it only "sees" the data entry characters and not the form features. However, it also prevents the type of business form identification process described in the 429 patent.

U.S. Pat. No. 5,937,084, by Crabtree, et al., entitled, "Knowledge-based Document Analysis System", issued Aug. 10, 1999 (084 patent), describes another method of identifying forms. The 084 patent describes a system and process whereby extracted features from a subject document are statistically compared with those of sample documents. Under this patent, the compared features are not limited to horizontal and vertical lines. The features include machine print and hand print. The disadvantages of the 084 patent arise with forms that have variable data fields and use dropout scanning. Although the 084 patent may focus on the print of the form for identification, it can only be print that is invariable. Thus, the print must be part of the form itself or data that can only be entered in a singular manner. In the former case, use of dropout scanning would prevent form identification if the print were in color since the scanning device would not "see" the print. In the latter case only forms having data fields that do not require variable data input could be identified. Furthermore, if dropout scanning were not used, misrecognitions would be more frequent due to interference with the form features.

SUMMARY OF THE INVENTION

The present invention provides a system and method for identifying a form prior to the data capture process using optical imaging technology. By having this ability in the automated data capture process, the operator need not sort through papers prior to initiation of the data capture process to remove complementary documents. The invention is able to distinguish between forms that are the subject of the data capture process and those that are not. If a system and method were not in place to perform this identification task, erroneous data would be captured and sent to the database and there would be a general slow down in the process.

The identification process is performed generally through digital imaging of context sensitive data fields, conversion of digitized data to computer readable character sets (string variables) and matching string variables to format sequences that are known to occur for the string variables in those fields. A scoring system is used based on the matching of data to the format sequences of the particular string variable. A given score provides a confidence level that the correct form is being readied for the data extraction process.

Data capture systems utilizing colored forms and dropout scanning can therefore identify business forms based on the input data and not simply the form features; i.e. colored vertical and horizontal lines, preprinted text and other markings. This type of system and method allows for increased character recognition through use of colored forms and dropout scanning while allowing form identification by looking at the data.

Often, forms that are the subject of data capture have complementary documents that exist alongside the target form. The present invention also provides for attachment of these complementary documents to the preceding or succeeding target form. Typically, forms and other documents are placed in stacks in the order that they are received. One or more complementary documents may follow or precede the target form until another target form appears in the stack. In these instances, the complementary documents are digitized; but instead of being used for data capture, they are flagged for electronic attachment to the preceding or succeeding target form to which they are presumably associated.

BRIEF DESCRIPTION OF THE DRAWINGS

[FIG. 3 removed]

FIG. 7 is a digitized image of a HCFA 1500.

FIG. 8 is a representation of the thickening process.

DESCRIPTION OF THE PREFERRED EMBODIMENT

Overview

Figure 1:
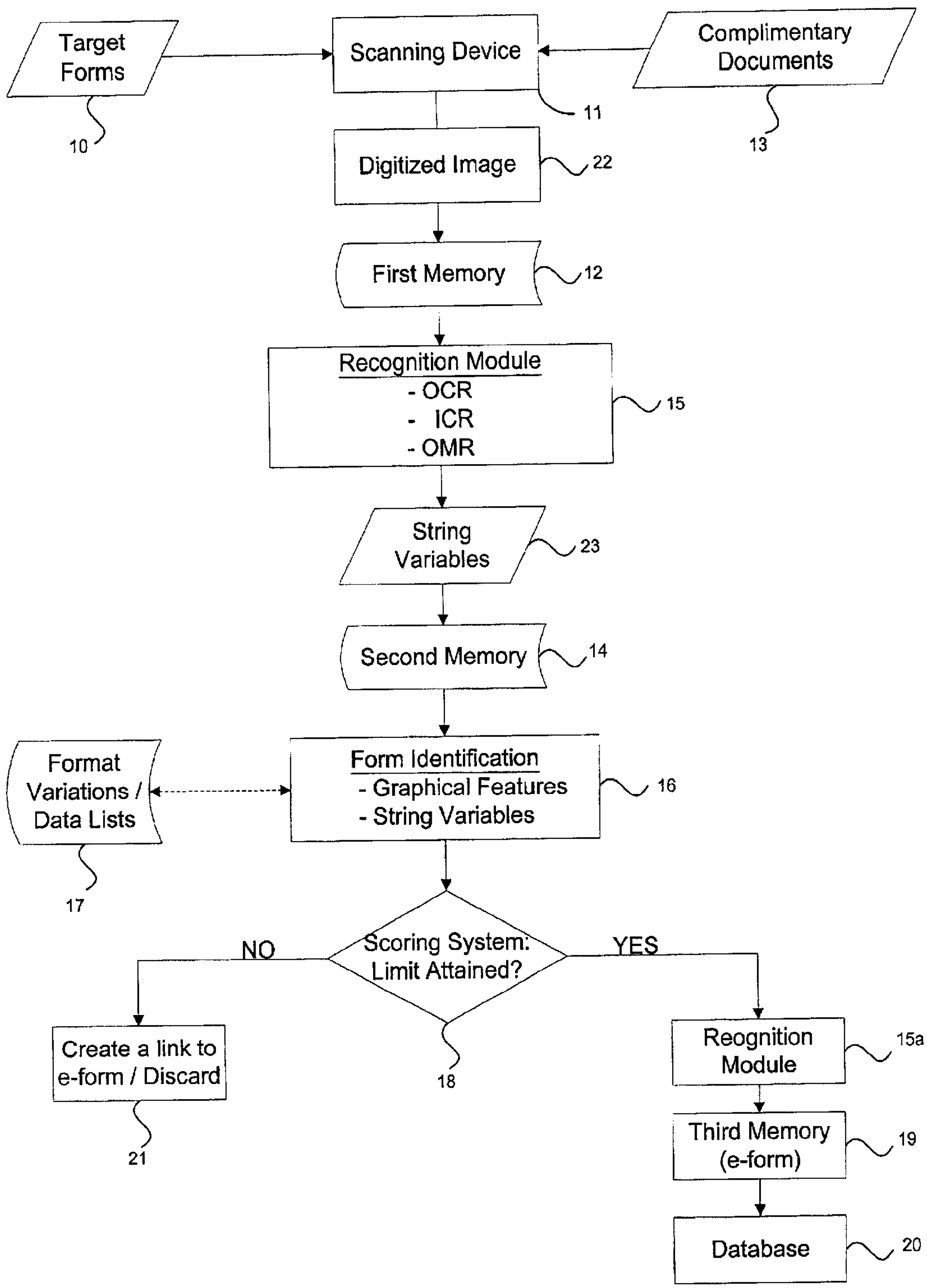
FIG. 1 is a simplified flowchart of the basic data capture process using optical imaging technology.

Referring to FIG. 1, a simplified flow diagram shows the basic process and system for data capture using optical imaging technology. Through this process, data written, typed or printed on to a target form can be extracted through a series of steps for input to database applications. Postprocessing of data stored in these database applications can be performed subject to the needs of the end user.

In FIG. 1, a series of target forms 10 are filled in with specified data. This occurs regularly in the normal course of business. Hand print, machine print, or writing may be used to enter data to the form. Target forms 10 are then scanned through a scanning type device 11. Scanning device 11 includes but is not limited to scanners, facsimile machines or other such digital imaging equipment that converts inked or otherwise marked paper into computer-generated bit-mapped images (digitized images 22). Digitized images 22 are stored in first memory 12 for subsequent use by application software. A recognition module 15 of the application software enables the conversion of digitized images 22 into computer readable characters, thus recreating specified parts of the form into string variables 23 and storing them in second memory 14. Recognition module 15 of the application software utilizes recognition algorithms such as optical character recognition (OCR), intelligent character recognition (ICR) and optical mark recognition (OMR) to perform the conversion. Recognition algorithms such as these are well known in the art.

String variables 23 are used in a two-step form identification process 16 to identify the image as having originated from the target form. Under the first step, certain graphical features (see FIG. 2), such as vertical lines 30, horizontal lines 31, thin blocks 32 and thick blocks, are sought. The occurrence or nonoccurrence of these graphical features provide an initial determination as to the source of the digitized image in order to suspend effort on digital images that are not from the target form. A scoring system 18 provides points for occurrences or nonoccurrences of these features. The initial determination threshold is designedly low. Therefore, a score assessed through scoring system 18 would have to be low in order to identify digitized image 22 as not originating from the target form. This prevents digitized images 22 that possibly originated from target forms 10 from being ignored in the data capture process while eliminating from consideration those that obviously did not originate from target forms; i.e. complementary documents 13. This has the effect of speeding up the process. The second identification step seeks out certain geographically sensitive data entered in variable format. Regions on digitized images are defined. Such regions can be of various shapes, such as rectangular, circular or elliptical, and of various sizes. These regions correspond with specific data fields on the target form. The portion of digitized image 22 contained within the boundaries of the region is recognized by recognition module 15. This transforms digitized image 22 into computer-readable character sets, referred to as string variables. In this manner it is possible for the application software to read a string variable from second memory 14 for comparative analysis against expected formats for that string variable 23. Scoring system 18 provides points when there is a match between the format of the recognized string variable and one of a list of format variations stored in a data list 17. Various limits are set and the scores attributed to identification step one and/or identification step two, to be discussed herein below, are compared against those limits for determination as to the source of digitized image 22. The limits provide a level of confidence that digitized image 22 is a derivative of the target form.

Once identified as a digitized image derived from the target form, the data capture process begins. The entire digitized image 22 is recognized by recognition module **15*a* and thus made into an electronic version of the target form (i.e. an e-form). The e-form is stored in a third memory 19. Datum or data from regions of the e-form, associated with specified fields of the hard copy target form, is read from third memory 19 and written to a specified field location in a database 20**. The data is stored in the database for subsequent processing by back office personnel.

Those digitized images 22 that do not meet the limit set by scoring system 18 are not necessarily discarded 21. They are assumed to have been derived from complementary documents 13 that followed or preceded target forms 10 in the stack of forms to be processed. This assumption is a valid one as office practice dictates stacking of forms and documents as they are received. The main form, typically the target form, is placed on the top or the bottom. Since these documents are complementary to the target form, there is a need to keep them associated with the form. When the scoring limit is not met, digitized image 22 that was assessed for identification is identified as not originating from the target form. No data is captured from this document. Instead, the data capture software creates a link 21 to the preceding or succeeding e-form, as the operator so chooses, so that if that particular e-form is addressed in memory, an association to the digitized image of the complementary document(s), if any, will be found.

Forms

Figure 2:
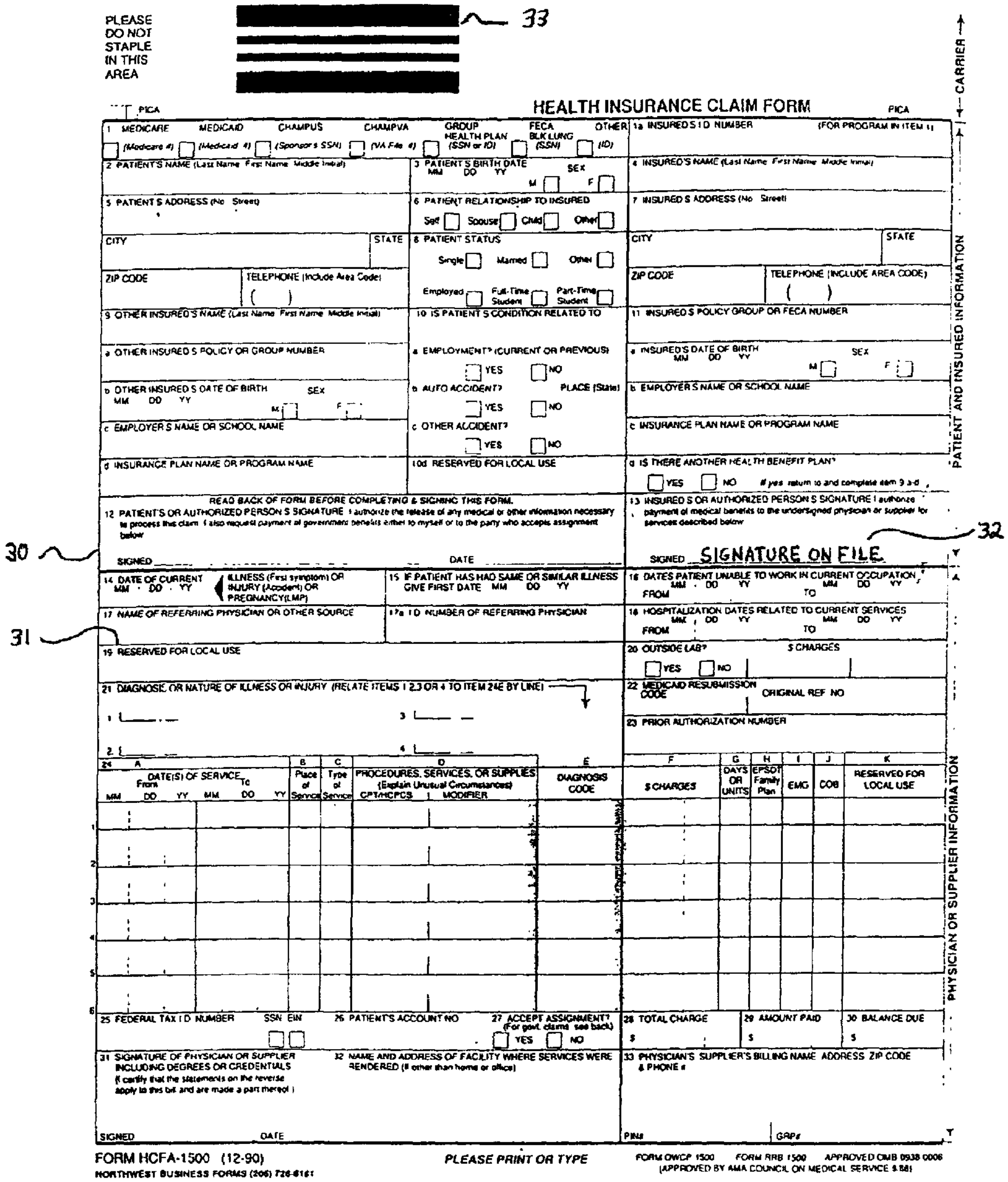
FIG. 2 shows certain graphical features of a HCFA 1500 form.

The preferred embodiment of this invention uses colored forms such as that shown in FIG. 2. This form is printed almost entirely in the color red. Only the bar code 33 at the top is in a color other than red. Forms of other colors, such as blue, green or yellow may also be used. Colored forms take advantage of the effects of dropout scanning. This technique, which is known in the art, prevents those features of the form that are similar in color to that of the light source used for scanning from being read by scanning device 11. The scanning device will read only markings of a different color. The colored form layout will not interfere with the reading by scanning device 11 or the recognition by recognition module 15 of the different colored markings.

Figure 4:
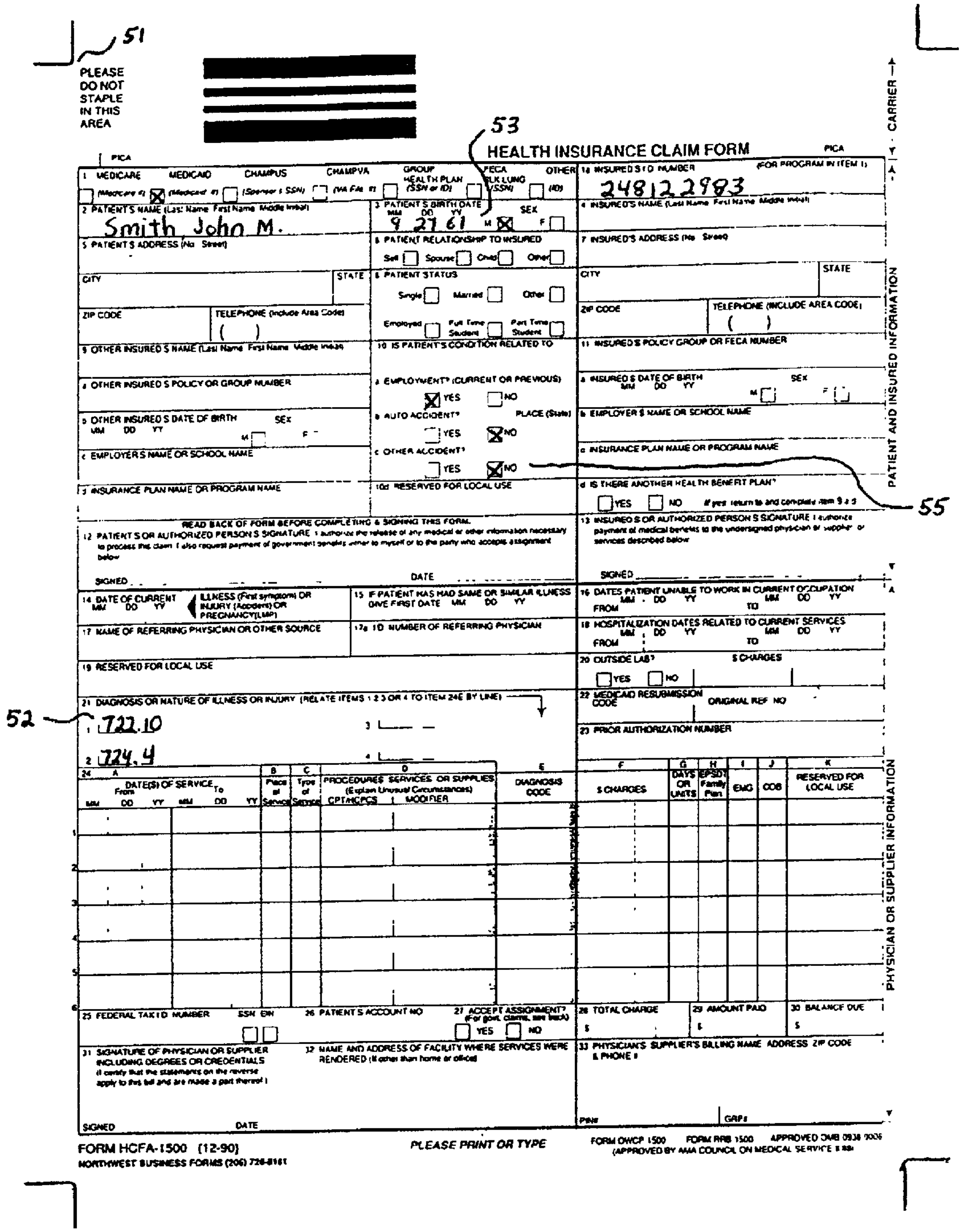
FIG. 4 specifies the reference point used in the preferred embodiment for the HCFA 1500 form and some of the data fields used for identification.

Referring to FIG. 4, a setup process defines specified fields of the target form. The fields are defined relative to reference point 51, such as the top, left-hand comer of the form face. The fields encompass regions where data in various forms, such as codes 52, date fields 53, choice data and check blocks 55, is placed. Data placed in these fields will be used to identify target forms prior to the data capture process.

Target forms 10 are filled out with appropriate data. Complementary documents 13 may accompany target form 10 for support of the filled-in data. Target forms 10 and complementary documents 13 are continuously stacked in a pile in preparation for the data capture process. Appropriately and typically, complementary documents 13 are adjacent to and behind or ahead of the target form that they support.

Scanning Device/Digitization

Figure 5:
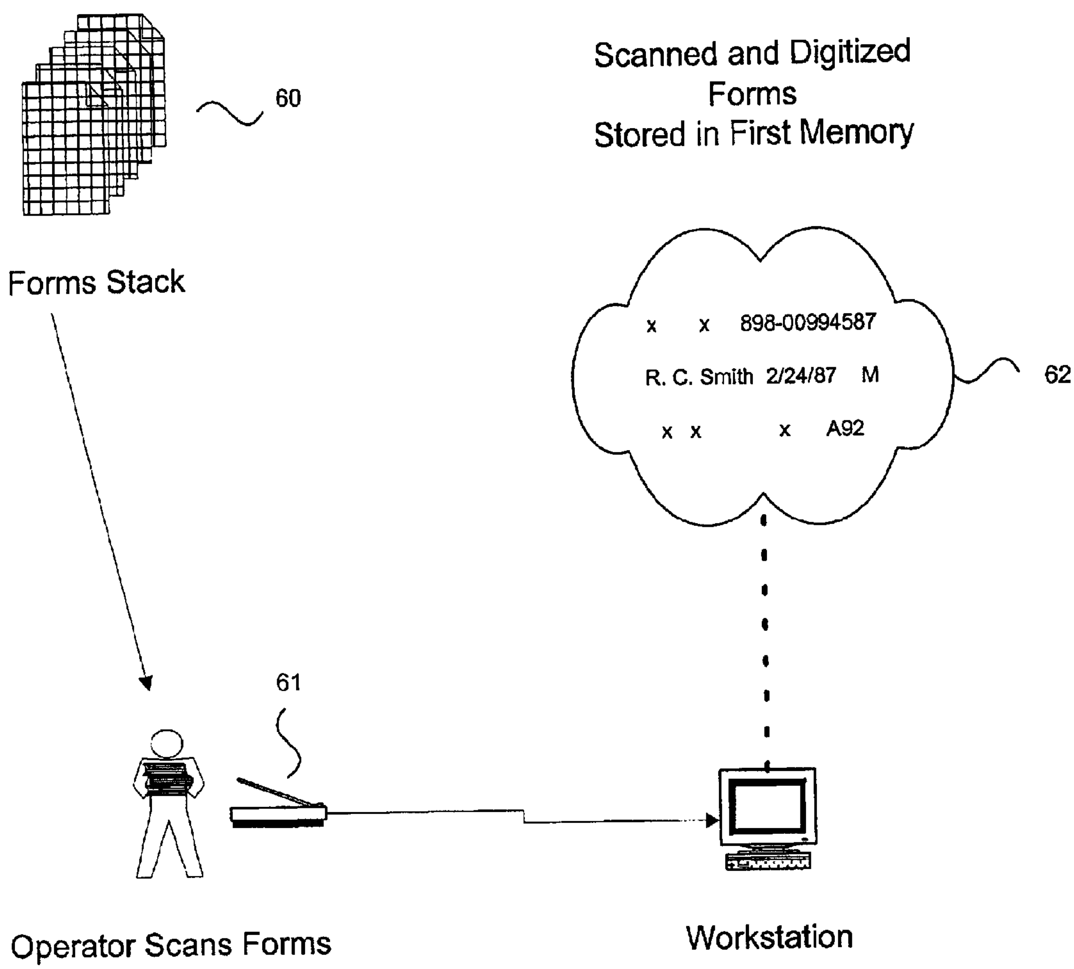
FIG. 5 shows the preparatory work performed prior to implementation of the application software.

Referring to FIG. 5, forms from form stacks 60 are placed through a scanning device 61, which includes but is not limited to scanners and facsimile machines, for digitization of the filled-in data. The form features are not digitized during this step if the form is in color and a dropout scanner is used. A digitized image 62 is created by scanning device 61 as shown in FIG. 5. A number of digitized images representing the number of target forms and complementary documents sent through scanning device 61, are stored in first memory 12 for later access by the application software.

Application Software

Figure 6:
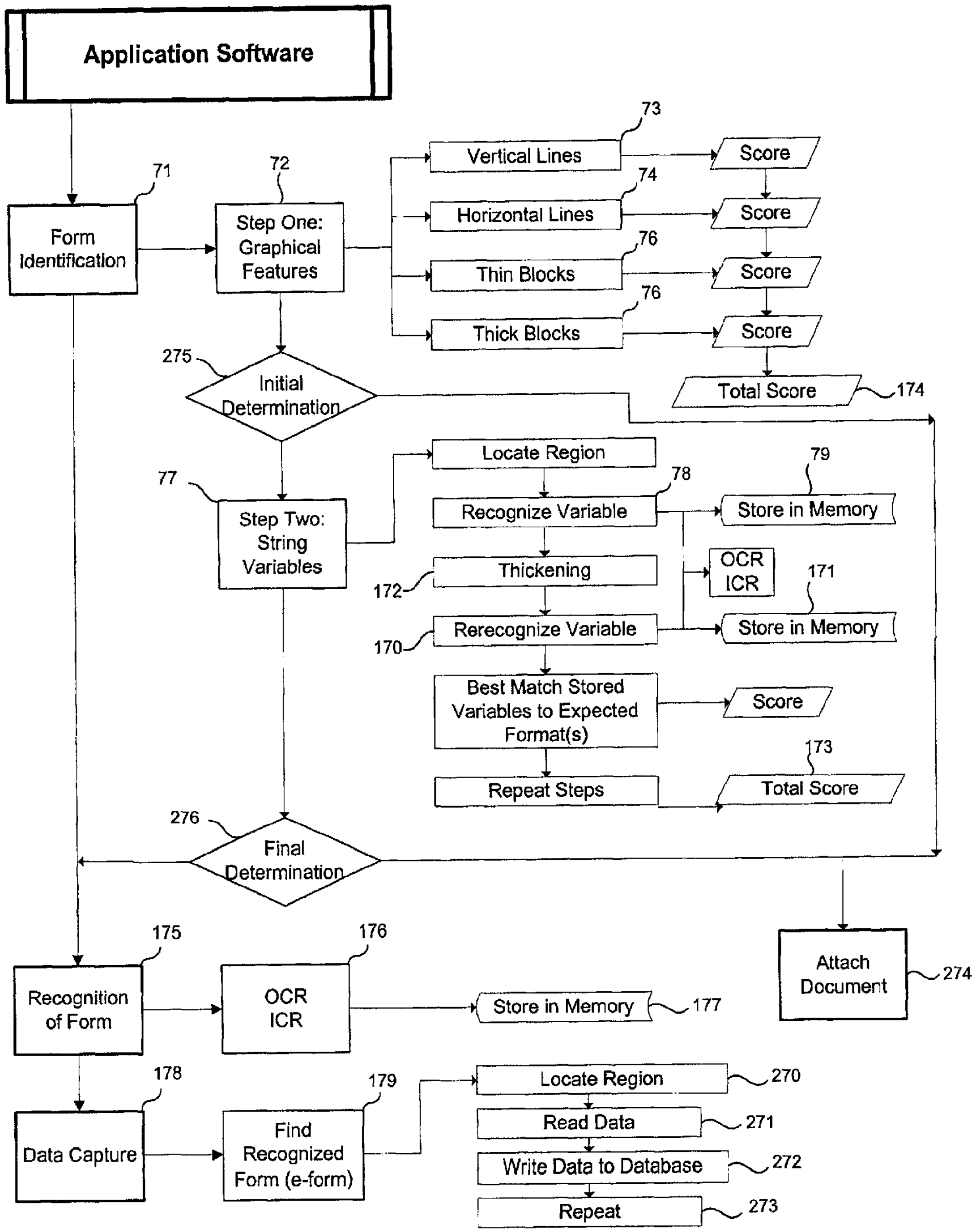
FIG. 6 is a detailed flowchart of the application software used in the automated data capture process.

Referring to FIG. 6, a flow chart of application software for the preferred embodiment is shown.

Form Identification

Form identification 71 employs a two-step process. Step one 72 uses the application software to locate the following graphical features on digitized image 22 of target form 10: vertical lines 73, horizontal lines 74, thin blocks 75 and thick blocks 76 (shown in FIG. 2). Vertical lines 73 run lengthwise across the form and horizontal lines 74 run the width of the form. Since colored forms and a dropout scanner device are used in the preferred embodiment, a hit on either a vertical or horizontal line tends to indicate that digital image 22 is not an image of target form 10. Although vertical lines 73 and horizontal lines 74 appear on target form 10, the dropout scanner is blind to them when creating digitized image 22. Therefore, they should not appear on digitized image 22 and a hit on either would be an indication that the digitized image being assessed did not originate from a target form. Scoring system 18, described in detail below, shows how occurrences of vertical or horizontal lines adversely affect the score for the preferred embodiment. Thin blocks 75, consist of closely spaced digitized data characters. Thin blocks 75 are originated from the field data of the form. Scanning device 11 converts the data into groups of closely spaced digitized characters. Each grouping is detected and assigned a count value; The total number of groupings detected affects the scoring system. This is described in detail below. Another parameter for identifying thin blocks, as opposed to blocks of another size, is the range of font sizes used on target form 10. The determination of font sizes is determined through an empirical study of a multitude of completed target forms. A digitized character or group of characters that exceeds the range of expected font sizes is classified as a thick block. The application software for the preferred embodiment should typically not detect thick blocks 76. Therefore, the maximum point value would be given for no occurrences. However, under certain conditions coded into the application software, some allowance can be given in the scoring system to the detection of thick blocks. Features such as page codes, stamps, and overlapped markings can exceed the range of font sizes and are thus recognized as thick blocks. These features are sometimes properly found on target forms and are therefore occasionally allowed for purposes of form identification. The total score 174 attained from each of the graphical features is entered into the scoring system for later addition to the total score 173 of step two. The precise point scheme for the preferred embodiment is described below.

Step two 77 of form identification 71 uses the input data and its respective format as identifying features. As shown in FIG. 7, region 80 is defined on what is a digitized image of a completed target form. A reference point 81 is used which corresponds in known manner with the reference point of the form. Therefore, region 80 corresponds with a specific data field from the form. For the preferred embodiment, region 80 is defined from the reference point in 1/1000-inch increments. Six separate regions are defined and scored as shown below relative to a reference point that is defined as the top, left-hand corner of the form:

| // Identification Step #2 - String Varibles | |
|---|---|
| HCFA_10_score | = 20 |
| HCFA_10_top | = 2000 |
| HCFA_10_bottom | = 5000 |
| HCFA_10_left | = 3250 |

-continued

| // Identification Step #2 - String Varibles | |
|---|---|
| HCFA_10_right | = 5250 |
| HCFA_3_score | = 15 |
| HCFA_3_top | = 1500 |
| HCFA_3_bottom | = 2500 |
| HCFA_3_left | = 3000 |
| HCFA_3_right | = 5000 |
| HCFA_12_or_13_score | = 10 |
| HCFA_12_top | = 4750 |
| HCFA_12_bottom | = 5900 |
| HCFA_12_left | = 500 |
| HCFA_12_right | = 3250 |
| HCFA_13_top | = 4750 |
| HCFA_13_bottom | = 5900 |
| HCFA_13_left | = 5000 |
| HCFA_13_right | = 8250 |
| HCFA_diag_score | = 4 |
| HCFA_diag_top | = 5750 |
| HCFA_diag_bottom | = 7750 |
| HCFA_diag_left | = 100 |
| HCFA_diag_right | = 1500 |
| HCFA_251_and_26_score | = 14 |
| HCFA_251_and_26_top | = 9000 |
| HCFA_251_and_26_bottom | = 10000 |
| HCFA_251 and_26_left | = 100 |
| HCFA_251_and_26_right | = 5500 |

The score for each of the six regions is shown as are the specified coordinates that define region 80. Within each of these defined regions, one or more digitized characters are expected. The digitized character(s) are recognized using OCR, ICR and/or OMR recognition modules 78 of the application software. OCR, ICR and/or OMR transform (through recognition) digitized characters into computer readable characters. Such computer readable characters may be found in the set of characters defined by the American Standard Code for Information Interchange (ASCII). They are predefined by code that is permanently set in a nonvolatile area of the computer memory. The recognized character images are stored as string variables, representing one or more computer readable characters, in a computer memory 79.

Step two 77 of form identification 71, to this point, is repeated: digitized characters or sets of characters are recognized and the resulting string variables are stored in memory 171. These digitized characters undergo a thickening process 172 prior to recognition. Referring to FIG. 8, this process adds pixel elements adjacent existing pixels to create a thicker, more easily recognized image. As before, OCR, ICR and/or OMR transforms one or more digitized characters per recognition module 170 into computer readable characters, or string variables. The string variables are stored in computer memory 171.

Scoring system 18 compares the first string variable stored in computer memory 79 with anticipated formats for that string variable. Such formats are established through empirical analysis of many completed forms and account for the variations used by input operators. Because multiple formats are acceptable, if/then/else statements are used in the application software to determine which format the string variable is being matched to. The application software begins by attempting to match the first character of the string to the accepted string variable formats. The application software continues one character at a time. As accepted formats are found, either full or partial, the software saves a temporary score and continues through the string. At the end of the routine the highest potential score is located, whether it be from the regular string variable stored in memory 79 or the string variable stored in memory 171 that underwent thickening 172. The highest potential score is returned to the scoring system. This is done for each of the six defined regions, repeating the steps until a total score 173 is attained for step two.

The precise scoring system used for the preferred embodiment is detailed below. At this point, the scores from form identification step one 72 and step two 77 are added together to obtain a combined total score. Should the combined total score meet or exceed a predefined limit (referred to hereinbelow as a confidence number), a confidence level is attained establishing the identification of the digitized image as originating from the target form. The application software flags this digitized image for the data capture process. Should the combined score not meet the confidence number, then the digitized image is flagged as not originating from the target form. Such documents are treated in a manner set by the operator during initialization of the application software. Such treatments include attachment or removal from memory.

Though various memories for storage of various features have been given different names, all memories could theoretically reside in the same designated area of computer memory.

Scoring System

The scoring system described below in pseudo-code is representative of the preferred embodiment to identify a HCFA 1500 form. STEP #1: GRAPHICAL FEATURE IDENTIFICATION

```
HORIZONTAL LINES
Initial horizontal line score=8
Subtract 1 point for each horizontal line found
Maximum subtraction value=8
If final score=0
Discontinue Identification Process, NOT target form
Else
Store horizontal line score=hline
VERTICAL LINES
Initial vertical line score=8
Subtract 1 point for each horizontal line found
Maximum subtraction value=8
If final score=0
    Discontinue Identification Process, NOT target form
Else
    Store vertical line score=vline
THIN BLOCKS
Initial thin block score=10
Initial thin block quantity=20
Subtract 1 point for each 2 thin blocks below initial quantity
Subtract 1 point for each thin block over 80
Store thin block score=thin_block
THICK BLOCKS
Initial thick block score=10
thin blocks/10=x
integer(x)=y
thick blocks=z
Subtract |y−z| from 10
If(10+y)−z>10
    Score 10
Else
    Score=(10+y)−z
```

```
Store thick block score=thick__block
Total Score=hline+vline+thin__block+thick__block=graphical__score
If graphical__score<18
COMPLIMENTARY FORM
Else
Continue to Step #2
STEP #2: STRING VARIABLES
CHECK BOXES FIELD
Initial check boxes score=20
If check boxes=3
    No change to score
If check boxes=2
    Score=20/x
        where x>1
If check boxes=1
    Score=20/y
        where y>1
If check boxes=0
    Score=0
Store check boxes score=check__boxes
DATE FIELD
Initial date score=15
If date found
    Score 15
If partial date found
    Score=15/x
        where x>1
If no date found
    Score=0
Store date score=date
SIGNATURE ON FILE FIELD
Initial signature on file score=10
If full text found
    Score=10
If partial text found
and If full text not found
    Score=10/x
        where x>1
Else, score=0
Store signature on file score=signature
DIAGNOSIS CODES FIELD
Initial diagnosis codes score=0
If one diagnosis code found
    Score=4
but If two diagnosis codes found
    Score=8
store diagnosis code=diagnosis
PATIENT IDENTIFIERS FIELD
Initial patient identifier score=0
If one numeric string found
    Score=5
but If two numeric strings are found
    Score=10
Else
    Score=0
store numeric string score=numeric
If one check box found
    Score=2
but If two check boxes found
    Score=4
Else
    Score=0
Store check box score=check__box
Store patient identifier score=numeric+check__box=patient
Total Score=check__boxes+date+signature+diagnosis+patient=field__identification__score
Total__Combined__Score=graphical__score+field__identification__score
confidence__number=100
If Total Combined Score>confidence__number
TARGET FORM
Else
COMPLIMENTARY FORM
```

The above scoring system shows a scheme for identifying a target form. Various scoring schemes can be used as well as various target fields. However, it is an essential feature of the invention that form identification and the scoring system be based on the data input to data fields of the target form.

Anticipated formats for a given data field will vary depending on the type of form and the type of data that is to be entered. For the preferred embodiment, the aniticipated formnats that would render a full or partial score to a matching string variable are as follows:

| | |
|---|---|
| Date field: | Nn/Nn/NNnn |
| | Nn Nn NNnn |
| | NNNNNNNN |
| | [acceptable ranges set for given digit pairs] |
| Check Boxes field: | X |
| | XX |
| | x |
| | Y |
| | N |
| | * |
| Signature on File field: | SIGNATURE__ON__FILE |
| | Signature__on__File |
| Diagnosis Codes field: | VNNNn |
| | vNNNn |
| | nNNN.Nn |
| | nNNN Nn |
| Patient Identifier field: | nnnnnNNNN(__)X(__)nnnnnNNNN(__)X |
| | nnnnnNNNN(__)X(__)nnnnnNNNN(__)x |
| | nnnnnNNNN(__)X(__)nnnnnNNNN(__)* |
| | nnnnnNNNN(__)x(__)nnnnnNNNN(__)X |
| | nnnnnNNNN(__)x(__)nnnnnNNNN(__)x |
| | nnnnnNNNN(__)x(__)nnnnnNNNN(__)* |
| | nnnnnNNNN(__)*(__)nnnnnNNNN(__)X |
| | nnnnnNNNN(__)*(__)nnnnnNNNN(__)x |
| | nnnnnNNNN(__)*(__)nnnnnNNNN(__)* |

where:
N = digit
n = optional digit
__ = space
(__) = any number of spaces
all other characters = literal Another embodiment of the invention compares field data to data lists. The data lists are comprised of the contextual data expected to occur in the given field as well as the formats in which they are expected to occur (same as above). The occurrence of these data items along with their respective formats is established through empirical analysis of a multitude of forms. All either have been found in the data field or are at least known to have a likelihood of appearing. Thus, a match between the field data entry and a member of the corresponding data list for that field is a positive indication of form identification. Use of multiple such data fields increases the confidence level of a positive identification. Furthermore, data matching can be used in conjunction with the above format matching for increased confidence. An example of data matching is shown below:

| Data Field | Data List |
|---|---|
| INSURANCE PLAN NAME OR | Blue Cross |
| PROGRAM NAME | BLUE CROSS |
| Kaiser Permanente | Group Health Association |
| | GHA |
| | GROUP HEALTH ASSOCIATION |
| | Kaiser Permanente |
| | KAISER PERMANENTE |
| | None |
| | NONE |

Recognition

Recognition of form step 175 follows a positive identification of the target form. The flagged digital image is read from first memory 12. The OCR, ICR and/or OMR recognition module 176 reads digitized images 22. All digitized characters on the digitized image are thus recognized; not just those within the selected regions used for form identification. Recognition module 176 converts the digitized image into computer readable characters. An e-form is created. The e-form resembles the digitized image except that because the digitized characters are transformed to computer readable characters, various manipulations, most notably corrections of flagged misspellings, can be accomplished. This is dependent on the sophistication of the application software. The e-form is stored in memory 177 in preparation for data capture.

Data Capture

The data capture module 178 of the application software finds the e-form 179 stored in memory 177. Data capture module 178 locates 270 a string variable on the e-form through a module of the application software that defines the region where the string variable is located. The string variable is read 271 and written 272 to a specified field of a database application. The database application is in communication with the data capture module through a module of the application software. The locate-read-write process is repeated 273 for each string variable that is to be included in the database application. The string variables to be included in the database application are specified through initial settings in the application software.

Attachment

After scoring, digitized images not meeting the scoring limit are classified as not originating from the target form; i.e complementary documents. Such digitized images are flagged with this classification. The application software handles them according to how the application software is enabled during the initial setup. One such enablement erases the digital image from memory. Another enablement processes the digital image through the data capture process despite the erroneous results that are received due to lack of field correspondence. A third enablement attaches the digitized image to an e- form. The operator may specify through initial settings of the application software whether to attach the digitized image preceding or succeeding the e-form. Attachment 274, as it pertains to this process, signifies an association established between the digitized images flagged as not originating from the target form and the e-form that precedes or follows it. The association is established through a module of the application software. Access to the e-form provides an ability to also access the digitized form(s) attached thereto.

Technical Advantages

Accordingly, it is a technical advantage of the invention to provide a form identification method and system for the data capture process which uses form features as well as the variable data input for identification as opposed to pure reliance on form features. The advantages of color forms and dropout scanning can be had along with a high accuracy method of form identification for fast and efficient automated processing of forms.

Another technical advantage of the invention is to include in the data capture process the ability to electronically attach complementary forms and attachments with the target form.

A further technical advantage of the invention is to apply a thickening process to the digitized images for enhanced recognition of data and therefore enhanced identification of forms.

Further technical advantages of the invention will become apparent from a consideration of the drawings and prior description.

Summary

Thus, it is apparent that there has been provided in accordance with the present invention, a method for identifying a target form for increased efficiency in the data capture process that satisfies the advantages set forth above. Although the preferred embodiment has been described in detail, it should be understood that various changes, substitutions, and alterations can be made herein. For example, in the string variable identification step described above, different fields of the form or different formats of the data could be used. Furthermore, a wholly different form could be substituted with corresponding data fields and formats used by that particular form. Other examples are readily ascertainable by one skilled in the art and could be made without departing from the spirit and scope of the present invention as defined by the following claims.

What is claimed is:

1. A method of identifying a target form having a plurality of data fields, comprising the steps of:

(a) scanning a form with a scanning means;

(b) storing a digitized image produced by said scanning means in a first memory;

(c) defining on the digitized image a first region having boundaries;

(d) attaining a string variable through recognition of the content of said digitized image located within the boundaries of said first region;

(e) comparing the format of the string variable to a plurality of format sequences; and (f) flagging said form for intended use in a data capture process if a defined match is found between the string variable and one of the plurality of format sequences.

2. The method of claim 1, wherein the content of the digitized image located within the boundaries of the first region is thickened prior to said recognition.

3. The method of claim 1, wherein the string variable is attained through recognition algorithms selected from the group comprising OCR, ICR and OMR.

4. The method of claim 1, wherein said scanning means is a dropout scanner.

5. The method of claim 1, wherein the reference point corresponds with the top, left-hand comer of the form.

6. The method of claim 1, wherein the region is rectangular in shape.

7. The method of claim 1, wherein the digitized image includes a reference point corresponding to a point on the form and the first region is located relative to the reference point and corresponds with a predefined data field on the target form.

8. The method of claim 1, wherein the string variable is compared to a list of predefined string variables expected in the data field corresponding with said first region and the defined match occurs when the string variable is definedly similar to one of a member of string variables from the list of string variables.

9. The method of claim 1, wherein a computer program is used in the storing, defining, attaining, comparing and flagging steps.

10. A method of identifying a target form having a plurality of data fields, comprising the steps of:

(a) scanning a form with a scanning means;

(b) storing a digitized image produced by said scanning means in a first memory;

(c) defining on the digitized image a first region having boundaries;

(d) attaining a string variable through recognition of the content of said digitized image located within the boundaries of said first region;

(e) comparing the format of the string variable to a plurality of format sequences;

(f) assigning a score based on a defined match between the string variable and one of the plurality of format sequences;

(g) repeating steps (c) through (f) for at least one other region and adding the scores to get a first total score; and (f) comparing said first total score to a confidence number whereby if said first total score equals or exceeds the confidence number the form is identified as the target form intended for use in a data capture process.

11. The method of claim 10, further comprising the steps of:

(a) locating graphical features of the form comprising vertical lines, horizontal lines, thin blocks and thick blocks;

(b) assigning a score based on the number of vertical lines;

(c) assigning a score based on the number of horizontal lines;

(d) assigning a score based on the number of thin blocks;

(e) assigning a score based on the number of thick blocks;

(g) adding the scores from steps (b) through (e) to get a second total score; and (h) comparing said second total score to a predetermined initial confidence number whereby if said initial confidence number is not met, the digital image is flagged as not being from said target form.

12. The method of claim 11, wherein said digitized image is erased from said first memory when the first total score does not equal or exceed the confidence number.

13. The method of claim 12, wherein said scanning means is a dropout scanner.

14. The method of claim 11, wherein said digitized image that does not attain a first total score that equals or exceeds the confidence number is electronically attached to the target form which precedes said digitized image in the data capture process.

15. The method of claim 11, wherein the digitized image that does not attain a first total score that equals or exceeds the confidence number is electronically attached to the target form which follows said digitized image in the data capture process.

16. The method of claim 11, wherein said digitized images that are not flagged have said second total score added to said first total score to attain a combined score and comparing said combined score to the confidence number whereby if said combined score equals or exceeds the confidence number, the form is identified as the target form intended for use in a data capture process.

17. The method of claim 11, wherein said thin blocks are derived from typescript having a font size between 10 point and 16 point and said thick blocks consist of typescript greater than font size 16 point.

18. The method of claim 11, wherein the content of the digitized image located within the boundaries of the first region is thickened prior to said recognition.

19. The method of claim 11, wherein the string variable is attained through recognition algorithms selected from the group comprising OCR, ICF and OMR.

20. The method of claim 11, wherein the digitized image includes a reference point corresponding to a point on the form and the first region is located relative to the reference point and corresponds with a predefined data field on the target form.

21. The method of claim 11, wherein the reference point corresponds with the top, left-hand corner of the form.

22. The method of claim 11, wherein the region is rectangular in shape.

23. The method of claim 11, wherein a computer program is used in the storing, defining, attaining, comparing and flagging teps.

24. The method of claim 23, wherein initial settings of the computer program which define said first region can be adjusted through a configuration parameter to alter the location of said first region relative to said reference point.

25. A method of identifying a target form having a plurality of data fields, comprising the steps of:

(a) scanning a form with a scanning means;

(b) storing a digitized image produced by said scanning means in a first memory;

(c) defining on the digitized image a first region having boundaries;

(d) attaining a first string variable through recognition of the content of said digitized image located within the boundaries of said first region;

(e) thickening the content of the digitized image located within the boundaries of said first region;

(f) repeating recognition of the content of the digitized image located within the boundaries of the first region post thickening to attain a second string variable and storing said second string variable in a third memory;

(g) comparing the format of the first string variable to a plurality of format sequences;

(h) assigning a score based on a defined match between the first string variable and one of the plurality of format sequences;

(i) repeating steps (g) and (h) for the second string variable;

(j) determining a highest score as between the first string variable and the second string variable based on the defined match of the first string variable and the second string variable with one of the plurality of format sequences;

(g) repeating steps (c) through (j) for at least one other region and adding the highest scores to get a first total score; and (i) comparing said first total score to a number representing a confidence number whereby if said total score equals or exceeds the confidence number the from is identified as the target form intended for use in a data capture process.

26. The method of claim 25, wherein a computer program is used in the storing, defining, attaining, comparing and flagging steps.

27. The method of claim 25, wherein the string variable is attained through recognition algorithms selected from the group comprising OCR, ICR and OMR.

28. The method of claim 25, wherein said scanning means is a dropout scanner.

29. The method of claim 25, wherein the digitized image includes a reference point corresponding to a point on the form and the first region is located relative to the reference point and corresponds with a predefined data field on the target form.

30. A system for identifying a target form having a plurality of data fields, comprising:

(a) a scanning means for scanning a form;

(b) a first memory for storing a digitized image produced by said scanning means;

(c) a first region on said digitized image said first region having boundaries;

(d) recognition means for transforming content of the digitized image located within the boundaries of the first region into a string variable;

(e) a means for matching the format of said string variable to a plurality of format sequences;

(f) a scoring means for assigning a score to said string variable said score based on a defined match between the string variable and one of the plurality of format sequences; and (h) a means for comparing the score to a confidence number whereby if the score exceeds said confidence number the form is flagged as a target form for use in the data capture process.

31. The system of claim 30, wherein said scanning means is a dropout scanner.

32. The system of claim 30, wherein said recognition means uses a recognition algorithm selected from the group comprising OCR, ICR and OMR.

33. A method of identifying a target form having a plurality of data fields, comprising the steps of:

(a) scanning a form with a scanning means;

(b) storing a digitized image produced by said scanning means in a first memory;

(c) defining on the digitized image a first region having boundaries;

(d) attaining a string variable through recognition of the content of said digitized image located within the boundaries of said first region;

(e) comparing the format of the string variable to a plurality of format sequences; and (f) flagging said form for intended use in a data capture process if a defined match is found between the string variable and one of the plurality of format sequences, wherein a computer program is used in the storing, defining, attaining, comparing and flagging steps, and wherein initial settings of the computer program which define said first region can be adjusted through a configuration parameter to alter the location of said first region relative to said reference point.

* * * * *

UNITED STATES PATENT AND TRADEMARK OFFICE

CERTIFICATE OF CORRECTION

PATENT NO. : 6,950,553 B1
DATED : September 27, 2005
INVENTOR(S) : Emily Ann Deere It is certified that error appears in the above-identified patent and that said Letters Patent is hereby corrected as shown below:

Column 1,
Line 7, delete "ptent" and insert -- Patent --.
Line 7, delete "aplication" and insert -- Application --.
Lines 9-10, delete "Identification." and insert -- Identification". --.

Column 2,
Line 10, after "of the" delete "form" and insert -- forms --.

Column 5,
Line 38, delete "comer" and insert -- corner --.

Column 6,
Line 25, delete "value;" and insert -- value. --.
Line 62, delete "Varibles" and insert -- Variables --.

Column 8,
Lines 31-32, after "form." delete "STEP #1: GRAPHICAL FEATURE IDENTIFICATION" and insert the same in line 32.
Line 65, after "Score" insert -- = --.

Column 9,
Line 27, after "Score" insert -- = --.

Column 10,
Line 23, delete "formnats" and insert -- formats --.

Column 11,
Line 52, delete "i.e" and insert -- i.e. --.
Line 61, delete "e- form" and insert -- e-form --.

Column 12,
Line 67, delete "comer" and insert -- corner --.

UNITED STATES PATENT AND TRADEMARK OFFICE

CERTIFICATE OF CORRECTION

PATENT NO. : 6,950,553 B1

DATED : September 27, 2005

INVENTOR(S) : Emily Ann Deere

It is certified that error appears in the above-identified patent and that said Letters Patent is hereby corrected as shown below:

<u>Column 13,</u>
Line 36, delete "(f)" and insert -- (h) --.
Line 52, delete "(g)" and insert -- (f) --.
Line 54, delete "(h)" and insert -- (g) --.

<u>Column 14,</u>
Line 22, delete "ICF" and insert -- ICR --.
Line 34, delete "teps." and insert -- steps. --.

<u>Column 15,</u>
Line 1, delete "(g)" and insert -- (k) --.
Line 4, delete "(i)" and insert -- (l) --.
Line 6, delete "from" and insert -- form --.

<u>Column 16,</u>
Line 3, delete "(h)" and insert -- (g) --.

Signed and Sealed this

Ninth Day of May, 2006

JON W. DUDAS

*Director of the United States Patent and Trademark Office*